United States Patent
Chateigner

(10) Patent No.: US 11,687,618 B2
(45) Date of Patent: Jun. 27, 2023

(54) SYSTEM AND METHOD FOR PROCESSING TEXT HANDWRITING IN A FREE HANDWRITING MODE

(71) Applicant: MyScript, Nantes (FR)

(72) Inventor: Alain Chateigner, Nantes (FR)

(73) Assignee: MyScript, Nantes (FR)

( * ) Notice: Subject to any disclaimer, the term of this patent is extended or adjusted under 35 U.S.C. 154(b) by 261 days.

(21) Appl. No.: 16/715,977

(22) Filed: Dec. 16, 2019

(65) Prior Publication Data

US 2020/0401796 A1    Dec. 24, 2020

(30) Foreign Application Priority Data

Jun. 20, 2019  (EP) .................................... 19181519

(51) Int. Cl.
| | |
|---|---|
| G06F 17/00 | (2019.01) |
| G06F 18/00 | (2023.01) |
| G06F 40/106 | (2020.01) |
| G06F 40/151 | (2020.01) |
| G06V 30/32 | (2022.01) |

(52) U.S. Cl.
CPC ............ G06F 18/00 (2023.01); G06F 40/106 (2020.01); G06F 40/151 (2020.01); G06V 30/347 (2022.01); G06V 30/36 (2022.01); G06F 2218/12 (2023.01)

(58) Field of Classification Search
CPC ...... G06V 30/347; G06V 30/36; G06V 10/22; G06F 40/106; G06F 40/151; G06F 17/212; G06F 17/242; G06F 3/04842; G06F 3/0486; G06F 3/04883

USPC ......................................................... 382/187
See application file for complete search history.

(56) References Cited

U.S. PATENT DOCUMENTS

| | | |
|---|---|---|
| 5,847,712 A | 12/1998 | Salesin |
| 5,867,596 A | 2/1999 | Kano et al. |
| 6,525,749 B1 | 2/2003 | Moran et al. |
| 6,647,145 B1 | 11/2003 | Gay |

(Continued)

FOREIGN PATENT DOCUMENTS

EP    1973063    1/2011

OTHER PUBLICATIONS

International Search Report for related Application No. PCT/EP2016/001720, dated Jan. 20, 2017, EPO—Internal WPI Data.

(Continued)

*Primary Examiner* — Jason T Edwards
(74) *Attorney, Agent, or Firm* — McDermott Will & Emery LLP

(57) ABSTRACT

The invention concerns a method comprising: detecting strokes of digital ink input on a computing device in a free handwriting format; detecting a text block from said strokes; performing text recognition on each text line of said text block, including extracting text lines from the text block and generating model data that associate each stroke of the text block with a character, a word and a text line of the text block; normalizing each text line from the free handwriting format into a structured format to comply with a document pattern. The normalization may comprise for each text line: computing a transform function to transform said text line into the structured format; applying the transform function to the text line; and updating the model data of said text line based on the transform function.

16 Claims, 8 Drawing Sheets

(56) References Cited

U.S. PATENT DOCUMENTS

| | | | |
|---|---|---|---|
| 7,218,779 B2 | 5/2007 | Dodge | |
| 7,298,903 B2 | 11/2007 | Wang et al. | |
| 7,324,691 B2 | 1/2008 | Li et al. | |
| 7,330,184 B2 | 2/2008 | Leung | |
| 7,352,902 B2 | 4/2008 | Li et al. | |
| 7,394,935 B2 | 7/2008 | Chen et al. | |
| 7,440,616 B2 | 10/2008 | Li et al. | |
| 7,496,232 B2 | 2/2009 | Bishop et al. | |
| 7,616,333 B2 | 11/2009 | Wakeam et al. | |
| 7,904,810 B2 | 3/2011 | Chen et al. | |
| 7,945,097 B2 | 5/2011 | Biswas et al. | |
| 8,014,607 B2 | 9/2011 | Saund et al. | |
| 8,316,299 B2 | 11/2012 | Asaka | |
| 8,718,375 B2 | 5/2014 | Ouyang et al. | |
| 8,782,549 B2 | 7/2014 | Ouyang | |
| 9,171,204 B2 | 10/2015 | Acharya | |
| 10,048,824 B2 | 8/2018 | Jung | |
| 2003/0007683 A1 | 1/2003 | Wang | |
| 2003/0215145 A1 | 11/2003 | Shilman et al. | |
| 2004/0155869 A1 | 8/2004 | Robinson | |
| 2004/0165774 A1* | 8/2004 | Koubaroulis | G06K 9/00409 382/179 |
| 2004/0252888 A1 | 12/2004 | Bargeron | |
| 2005/0063592 A1 | 3/2005 | Li et al. | |
| 2005/0063594 A1 | 3/2005 | Li et al. | |
| 2005/0135678 A1* | 6/2005 | Wecker | G06K 9/222 382/186 |
| 2006/0061780 A1 | 3/2006 | Chen et al. | |
| 2006/0098871 A1 | 5/2006 | Szummer | |
| 2006/0210173 A1 | 9/2006 | Jurion | |
| 2006/0218171 A1 | 9/2006 | Wakeman et al. | |
| 2007/0154094 A1* | 7/2007 | Lin | G06K 9/42 382/187 |
| 2008/0195931 A1 | 8/2008 | Raghupathy | |
| 2008/0232690 A1 | 9/2008 | Saund et al. | |
| 2009/0161958 A1 | 6/2009 | Markiewicz et al. | |
| 2010/0171754 A1* | 7/2010 | Hatfield | G06K 9/00416 345/619 |
| 2014/0177962 A1 | 6/2014 | Torgerson | |
| 2014/0313216 A1 | 10/2014 | Steingrimsson | |
| 2014/0325435 A1 | 10/2014 | Jung | |
| 2015/0206005 A1 | 7/2015 | Jung | |
| 2017/0068868 A1 | 3/2017 | Cartune | |
| 2017/0091153 A1* | 3/2017 | Thimbleby | G06F 3/0486 |
| 2017/0109032 A1* | 4/2017 | Melinand et al. | G06F 40/171 |
| 2017/0109578 A1 | 4/2017 | Bednarowicz | |
| 2018/0114059 A1* | 4/2018 | Ric | G06K 9/00865 |
| 2018/0349692 A1* | 12/2018 | Dixon | G06K 9/222 |

OTHER PUBLICATIONS

Plimmer et al., "Beautifying sketching-based design tool content: Issues and experiences," 6th Australasian User Interface Conference, 2005.

Wang et al., "Exploring sketch beautification techniques," CHINZ'05, Jul. 2005, pp. 15-16.

Fiser et al., "Shipshape: A drawing beautification assistant," The Eurographics Association 2015.

EESR—European Search Report for related Application No. EP 19181519.0, dated Jan. 3, 2020, pp. 1-6.

* cited by examiner

SYSTEM AND METHOD FOR PROCESSING TEXT HANDWRITING IN A FREE HANDWRITING MODE

CROSS REFERENCE TO RELATED APPLICATIONS

This application claims priority to European Application No. 19181519.0, filed on Jun. 20, 2019, the entire contents of which is incorporated herein.

TECHNICAL FIELD

The present disclosure relates generally to the field of computing device interface capable of recognizing user input handwriting of text. In particular, the present disclosure concerns computing devices and corresponding methods for recognizing and editing text handwriting.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Each type of computing device is equipped with particular computing resources and destined for given uses. Computing devices generally comprise of at least one processing element, such as a central processing unit (CPU), some form of memory, and input and output devices. The variety of computing devices and their subsequent uses necessitate a variety of input devices and interfaces to allow users to interact with their computing devices.

One such input device is a touch sensitive surface such as a touchscreen or touchpad wherein the user input is received through contact between a user body part (e.g. a finger) or an instrument (e.g. a pen or stylus), and the touch sensitive surface. Another input device is an input surface that senses gestures made by a user above the input surface. A further input device is a position detection system which detects the relative position of either touch or non-touch interactions with a non-touch physical or virtual surface.

Handwriting recognition can be implemented in computing devices to input and process various types of input elements hand-drawn or handwritten by a user, such as text content (e.g., alphanumeric characters) or non-text content (e.g. shapes, drawings). Once input on a computing device, the input elements are usually displayed as digital ink and undergo handwriting recognition to be converted into typeset versions. The user handwriting input is typically interpreted using a real-time handwriting recognition system or method. To this end, either on-line systems (recognition carried out using a cloud-based solution or the like) or off-line systems may be used.

The user input may be diagrams or any other content of text, non-text or mixed content of text and non-text. Handwriting input may be made on a structured document according to guiding lines (or base lines) which guide and constraint input by the user. Alternatively, a user may handwrite in free handwriting mode, i.e. without any constraints of lines to follow or input size to comply with (e.g. on a blank page).

FIG. 1A shows an example of a computing device 1 comprising a display device 1 which displays ink input elements hand-drawn or handwritten by a user in a free handwriting mode using an appropriate user interface. In the present case, the computing device 1 detects and displays text content 4 and 6 and non-text content 8, 10 and 12. Each of these elements is formed by one or more strokes of digital ink. Input elements may comprise for instance text handwriting, diagrams, musical annotations, and so on. In this example, the shape 8 is a rectangle or the like which constitutes a container (a box) containing text content 6 so that both elements 6 and 8 can be selected and manipulated together.

Handwriting recognition may be performed on text input elements and possibly also on non-text input elements. In addition, each input element may be converted and displayed as typeset input elements, as depicted in this example in FIG. 1B.

In handwriting recognition applications, the performances in terms of text recognition are not always satisfactory, especially in case text handwriting is input in a free handwriting mode (i.e. in a free handwriting format). Issues of reliability and stability of the text recognition process often undermine the performances of such computing devices, thereby limiting the overall user experience. Limitations may result notably from the difficulty for a computing device to determine when a new ink stroke affects a previous state of the recognition (i.e. a previous recognition result based on previously input ink strokes) and when it does not affect such a previous state of the recognition (i.e. the new ink stroke relates to new content which does not affect previously input content).

Furthermore, it is usually possible to perform some level of editing on user input displayed on a computing device. Conventionally, such applications are however limited in their capabilities to handle editing functions and typically constrain users to adopt behaviors or accept compromises which do not reflect the user's original intent.

Display and editing functions are more particularly limited on computing devices when text handwriting is input using a free handwriting mode. By nature, no constraint of lines, size, orientation, margin or the like is imposed on a user in a free handwriting mode, such that various and complex forms of handwriting may be input, thereby rendering more difficult the implementation of editing functions by a computing device to manipulate text handwriting (e.g. move, rescale, correct, insert line breaks in a text flow). A user may however wish to edit and manipulate the handwriting input in a more structured and advanced manner, especially when a free handwriting mode is used. These limitations in handling handwritten text input in a free handwriting format undermine the user experience and call for improvements.

There is a need for a solution allowing efficient and reliable processing of text handwriting input in a free handwriting mode (or format), and in particular to improve text recognition and allow efficient editing of such a text handwriting on a computing device.

SUMMARY

The examples of the present invention that are described herein below provide computing devices, methods and corresponding computer programs for editing user input handwritten text.

According to a particular aspect, the invention provides a method for processing text handwriting on a computing device, the computing device comprising a processor, a memory and at least one non-transitory computer readable medium for processing text handwriting under control of the processor, the method comprising:

detecting a plurality of input strokes of digital ink with an input surface, said input strokes being input in a free handwriting format without any handwriting constraint;

displaying said plurality of input strokes on a display device in said free handwriting format;

classifying each input stroke as text or non-text, said classifying comprising detecting as text at least one text block from said input strokes;

performing text recognition on said at least one text block, said text recognition comprising: extracting text lines from said at least one text block and generating model data that associate each stroke of said at least one text block with a character, a word and a text line of said at least one text block;

normalizing each text line from the free handwriting format into a structured format to comply with a document pattern (200), said normalization comprising for each text line: computing for said text line a respective transform function to transform said text line into the structured format; applying the respective transform function to transform each stroke of said text line into the structured format; and updating the model data of said text line based on the respective transform function.

In a particular embodiment, the method comprises storing the model data generated during said text recognition, wherein said updating the model data further comprises storing the updated model data of said at least one text block in replacement of the model data generated during said text recognition.

In a particular embodiment, the method comprises, after said normalizing, displaying the text lines of said at least one text block in the structured format.

In a particular embodiment, the model data of the at least one text block comprise:

character information defining a plurality of characters, each character being associated with at least one stroke of digital ink and with a text line of said at least one text block;

word information defining a plurality of words, each word being associated with at least one character as defined by the character information; and line information defining each text line of said at least one text block, each text line being associated with at least one word as defined by the word information.

In a particular embodiment, the line information comprises, for each text line of said at least one text block: origin coordinates representing an origin of the text line; slant information representing a slant of the text line; and height information representing a height of the text line.

In a particular embodiment, said updating the model data during said normalizing comprises updating the line information of said text line based on the respective transform function.

In a particular embodiment, said normalizing comprises for each text line: determining input parameters comprising the origin coordinates, the slant information and the height information of said text line; wherein the respective transform function is computed based on the input parameters and on the document pattern.

In a particular embodiment, the document pattern defines at least one of the following handwriting constraints to be complied with by text: a margin of a display area; a line pattern; and an interline distance.

In a particular embodiment, each transform function defines at least one of the following transformation components to be applied on a respective text line during said normalizing: a translation component; a scale component; and a rotation component.

In a particular embodiment, the document pattern comprises a line pattern defining guidelines according to which text is to be arranged in the structured format.

In a particular embodiment, the scale component of the transform function is determined during said normalizing based on a ratio of the distance between two consecutive guidelines of said line pattern relative to the height of the respective text line.

In a particular embodiment, the translation component of the transform function is determined during said normalizing to perform a translation of a text line so that the origin of said text line is moved to be aligned with a corresponding guideline of the line pattern which is assigned to said text line during said normalizing.

In a particular embodiment, said rotating component is determined during said normalizing to rotate a respective text line so at to reduce its slant to zero in accordance with the document pattern.

In a particular embodiment, during said normalizing, the model data of each text line is updated according to the respective transform function while blocking any text recognition that may result from said applying the respective transform function.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method for hand-drawing input elements on a computing device as defined in the present document, the computing device comprising a processor for executing the steps of said method.

The present invention also relates to a computing device suitable to implement the method as defined in the present disclosure. More particularly, the present invention provides a computing device for handwriting text, comprising:
- an input surface for detecting a plurality of strokes of digital ink, said strokes being input in a free handwriting format without any handwriting constraint;
- a display device for displaying said plurality of input strokes in said free handwriting format;
- a classifier for classifying each stroke as text or non-text, said classifier being configured to detect as text at least one text block from said input strokes;
- a line extractor to extract text lines from said at least one text block;
- a recognition engine for performing a text recognition on each text line of said at least one text block, thereby generating model data that associate each stroke of said at least one text block with a character, a word and a text line of said at least one text block;
- a text editor for normalizing each text line from the free handwriting format into a structured format to comply with a document pattern, said text editor being configured to perform for each text line: computing for said text line a respective transform function to transform said text line into the structured format; applying the respective transform function to transform each stroke of said text line into the structured format; and updating the model data of said text line based on the respective transform function.

The present invention also relates to a non-transitory computer readable medium having a computer readable program code embodied therein, said computer readable program code adapted to be executed to implement a method for processing text handwriting on a computing device, the computing device comprising a processor, a memory and at least one non-transitory computer readable medium for processing text handwriting under control of the processor, the method comprising:
- detecting a plurality of input strokes of digital ink with an input surface, said input strokes being input in a free handwriting format without any handwriting constraint;
- displaying said plurality of input strokes on a display device in said free handwriting format;
- classifying each input stroke as text or non-text, said classifying comprising detecting as text at least one text block from said input strokes;
- performing text recognition on said at least one text block, said text recognition comprising: extracting text lines from said at least one text block and generating model data that associate each stroke of said at least one text block with a character, a word and a text line of said at least one text block;
- normalizing each text line from the free handwriting format into a structured format to comply with a document pattern (200), said normalization comprising for each text line: computing for said text line a respective transform function to transform said text line into the structured format; applying the respective transform function to transform each stroke of said text line into the structured format; and updating the model data of said text line based on the respective transform function.

The various embodiments defined above in connection with the method of the present invention apply in an analogous manner to the computing device, the computer program and the non-transitory computer readable medium of the present disclosure.

For each step of the method of the present invention as defined in the present disclosure, the computing device may comprise a corresponding module configured to perform said step.

In a particular embodiment, the disclosure may be implemented using software and/or hardware components. In this context, the term "module" can refer in this disclosure to a software component, as well as a hardware component or a plurality of software and/or hardware components.

BRIEF DESCRIPTION OF THE DRAWINGS

Other characteristics and advantages of the present disclosure will appear from the following description made with reference to the accompanying drawings which show embodiments having no limiting character. In the figures.

Figure 1A:
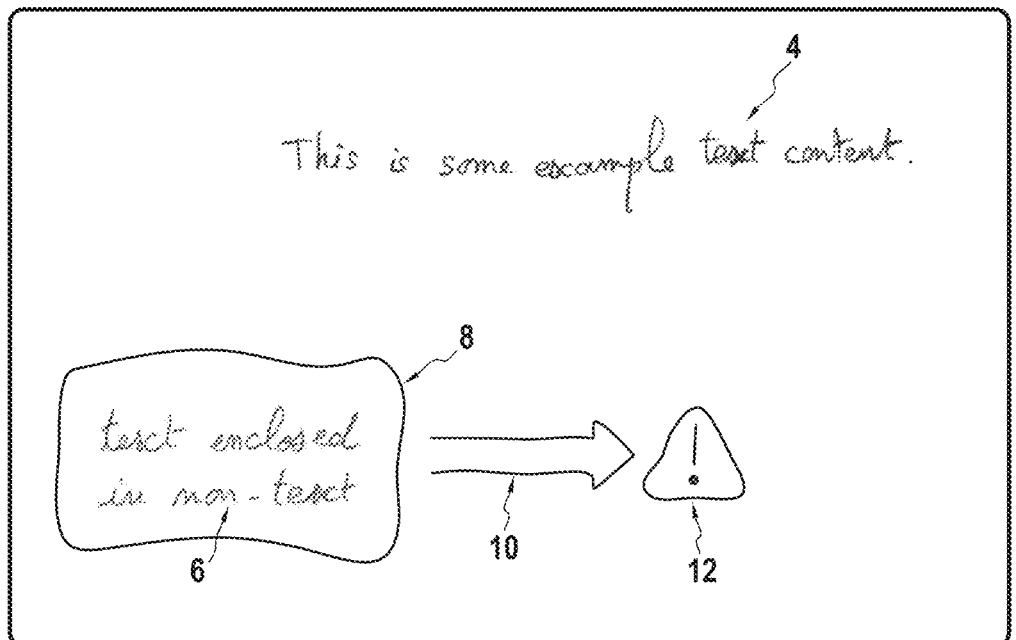
FIGS. 1A-1B represent a digital device according to a conventional arrangement.
Figure 1B:
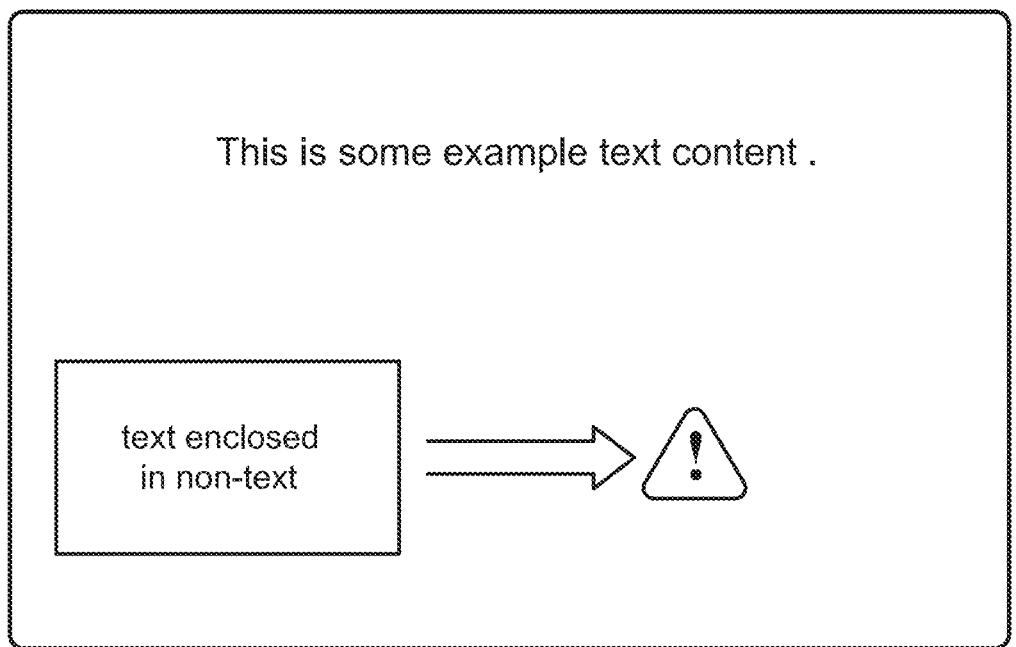

The components in the figures are not necessarily to scale, emphasis instead being placed upon illustrating the principles of the present invention.

For simplicity and clarity of illustration, the same reference numerals will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The use of the term "text" in the present description is understood as encompassing all characters (e.g. alphanumeric characters or the like), and strings thereof, in any written language and any symbols used in written text.

The term "non-text" in the present description is understood as encompassing freeform handwritten or hand-drawn content (e.g. shapes, drawings, etc.) and image data, as well as characters, and string thereof, or symbols which are used in non-text contexts. Non-text content defines graphic or geometric formations in linear or non-linear configurations, including containers, drawings, common shapes (e.g. arrows, blocks, etc.) or the like. In diagrams for instance, text content may be contained in a shape (a rectangle, ellipse, oval shape, etc.) called containers.

Furthermore, the examples shown in these drawings are in a left-to-right written language context, and therefore any reference to positions can be adapted for written languages having different directional formats.

The various technologies described herein generally relate to capture, processing and management of hand-drawn or handwritten content on portable and non-portable computing devices. The systems and methods described herein may utilize recognition of user's natural writing and drawing styles input to a computing device via an input surface, such as a touch sensitive screen (as discussed later). Whilst the various embodiments are described with respect to recognition of digital ink handwriting input using so-called online recognition techniques, it is understood that application is possible to other forms of input for recognition, such as offline recognition involving a remote device or server to perform recognition.

The terms "hand-drawing" and "handwriting" are used interchangeably herein to define the creating of digital contents (handwriting input) by users through use of their hands (or fingers) or an input device (hand-held stylus or digital pen, mouse, etc.) on or with an input surface. The term "hand" or the like is used herein to provide concise description of the input techniques, however the use of other parts of a user's body for similar input is included in this definition, such as foot, mouth and eye.

As described in more details below, an aspect of the present invention relies on detecting text handwriting of digital ink which is input on a computing device in a free handwriting format, performing text recognition which involves generating model data representative of the text handwriting input (or input text handwriting), and performing a normalization of each text line of the text handwriting input from the free handwriting format into a structured format to comply with a document pattern. This normalization implies performing editing transformations (e.g. translation, rotation and/or rescaling) on the text handwriting input to convert it into the structured format. The model data are also updated in accordance with the editing transformations applied to the text handwriting input for the purpose of normalization. In other words, the transform functions applied to each respective text line of the text handwriting input when performing the normalization is also used as a basis to update the model data of the text lines. As explained below in particular embodiments, model data define correlations between each stroke of the text handwriting input with a respective character, a respective word and a respective text line of the text handwriting input.

By updating the model data as part of the normalization process, text handwriting input of digital ink can be efficiently converted from an unconstrained environment (in a free handwriting format) into a formatted environment (in a structured format), thereby allowing better display, more reliable text recognition and more extensive manipulations such as editing of the text handwriting input. As explained further below, although the normalization process leads to modification of the input ink, any previous text recognition state is preserved. This can be achieved because the text handwriting input and the model data are updated using the same transforms.

Figure 2:
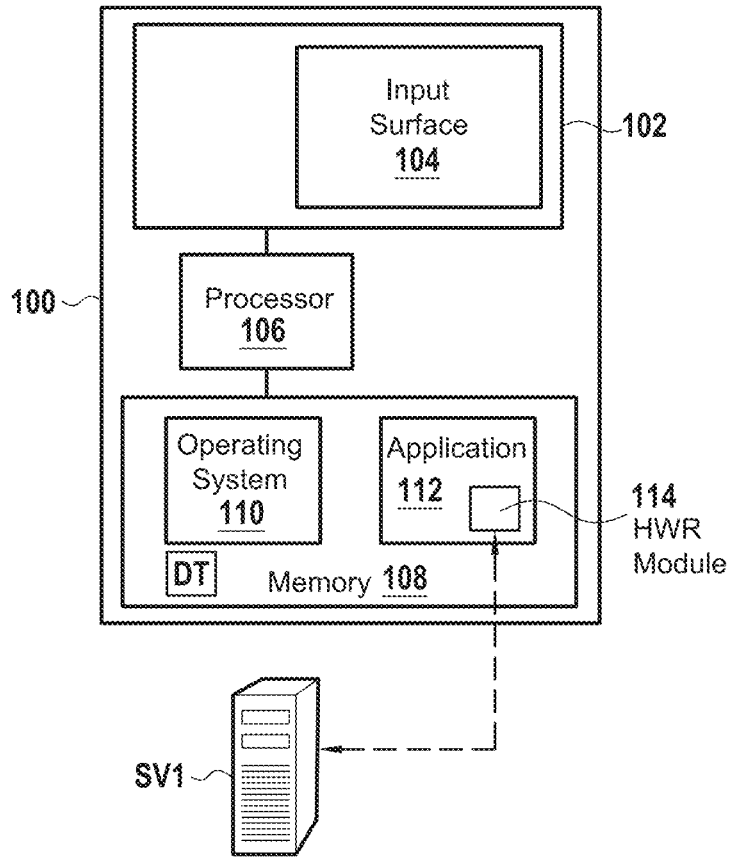
FIG. 2 is a block diagram representing schematically a computing device according to a particular embodiment of the invention.

FIG. 2 shows a block diagram of a computing device 100 according to a particular embodiment of the present invention. The computing device (or digital device) 100 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing elements, some form of memory and input and output (I/O) devices. The components communicate with each other through inputs and outputs, such as connectors, lines, buses, links networks, or others known to the skilled person.

More specifically, the computing device 100 comprises an input surface 104 for hand-drawing (or handwriting) input elements including text and non-text elements, as described further below. More particularly, the input surface 104 is suitable to detect a plurality of input strokes of digital ink entered on said input surface. As also discussed further below, these input strokes may be input in a free handwriting format (or in a free handwriting mode), that is, without any handwriting constraint of position, size and orientation in an input area.

The input surface 104 may employ technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 104 may be a non-touch sensitive surface which is monitored by a position detection system.

The computing device 100 also comprises at least one display device (or display) 102 for outputting data from the computing device such as images, text and video. The display device 102 may be a screen or the like of any appropriate technology (LCD, plasma, etc.). As described further below, the display device 102 is suitable to display input elements in digital ink, each input element being formed of at least one stroke of digital ink. In particular, the display device 102 may display a plurality of strokes input with the input surface 104, for instance in the above-mentioned free handwriting format.

The input surface 104 may be co-located with the display device 102 or remotely connected thereto. In a particular example, the display device 102 and the input surface 104 are parts of a touchscreen.

As depicted in FIG. 2, the computing device 100 further comprises a processor 106 and a memory 108. The computing device 100 may also comprise one or more volatile storing elements (RAM) as part of the memory 108 or separate thereof.

The processor 106 is a hardware device for executing software, particularly software stored in the memory 108. The processor 108 can be any custom made or commercially available general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 108 constitutes (or comprises) a non-transitory (or non-volatile) computer readable medium (or recording medium) in accordance with a particular embodiment of the disclosure. The memory 108 may include any combination of non-volatile storing elements (e.g. ROM, EPROM, flash PROM, EEPROM, hard drive, magnetic or optical tape, memory registers, CD-ROM, WORM, DVD, or the like).

The memory 108 may be remote from the computing device 100, such as at a server or cloud-based system, which is remotely accessible by the computing device 100. The non-volatile memory 108 is coupled to the processor 106, so that the processor 106 is capable of reading information from and writing information to the memory 108. As an alternative, the memory 108 is integral to the computing device 100.

The memory 108 includes an operating system (OS) 110 and a handwriting application (or computer program) 112. The operating system 110 controls the execution of the application 112. The application 112 constitutes (or comprises) a computer program (or computer-readable program code) according to a particular embodiment of the invention, this computer program comprising instructions to implement a method according to a particular embodiment of the invention.

The application 112 may include instructions for detecting and managing ink input elements handwritten by a user using the input surface 104 of the computing device 100. As discussed later, these handwritten ink input elements (also called handwriting input) which may be text or non-text, are formed by one or plural strokes of digital ink.

The application 112 may comprise a handwriting recognition (HWR) module (or system) 114 for recognizing handwriting input to the computing device 100, including handwritten text and non-text. The HWR 114 may be a source program, an executable program (object code), script, application, or any other component having a set of instructions to be performed. In the present example depicted in FIG. 2, the application 112 and the HWR module 114 are combined in a single application (the HWR module 114 is part of the application 112). Alternatively, the HWR module 114 may be a module, method or system for communicating with a handwriting recognition system remote from the computing device 100, such as a server (or cloud-based system) SV1 as depicted in FIG. 2 which is remotely accessible by the computing device 100 through an appropriate communication link. The application 112 and the HWR module 114 may also be separate components stored in the memory 108 (or in different memories) of the computing device 100, whereby the application 112 and the HWR module 114 operate together accessing information processed and stored in the memory 108.

As shown later in the figures, input strokes entered on or via the input surface 104 are processed by the processor 106 as digital ink. Digital ink is formed by rendering handwriting input in digital image format, in this case on the display device 102.

A user may enter an input stroke with a hand or finger, or with some input instrument such as a digital pen or stylus suitable for use with the input surface 104. The user may also enter an input stroke by making a gesture above the input surface 104 if means configured to sense motions in the vicinity of the input surface 104 is being used, or with a peripheral device of the computing device 100, such as a mouse or a joystick or the like.

Each ink input element (letters, symbols, words, shapes, etc.) is formed by one or a plurality of such input strokes or at least by a portion of a stroke. A stroke (or input stroke) is characterized by at least a stroke initiation location (corresponding to a "pen down" event), a stroke terminal location (corresponding to a "pen up" event), and the path connecting the stroke initiation and the stroke terminal locations. Because different users may naturally write or hand-draw a same object (e.g. letter, shape, symbol, etc.) with slight variations, the HWR module 114 accommodates a variety of ways in which each object may be entered whilst being still recognized as the correct or intended object.

The handwriting application 112 allows generating handwritten or hand-drawn content (e.g., text, diagrams, charts, shapes, drawings, or any kind of text and/or non-text handwriting input) in digital ink form and have this content faithfully recognized using the HWR module 114.

In the present example, the memory 108 is also suitable to store model data DT that define a model document representative of text handwriting input from a user on the computing device 102 with the input surface 104. The nature and use of such model data DT will be discussed in more detail hereafter.

Figure 3:
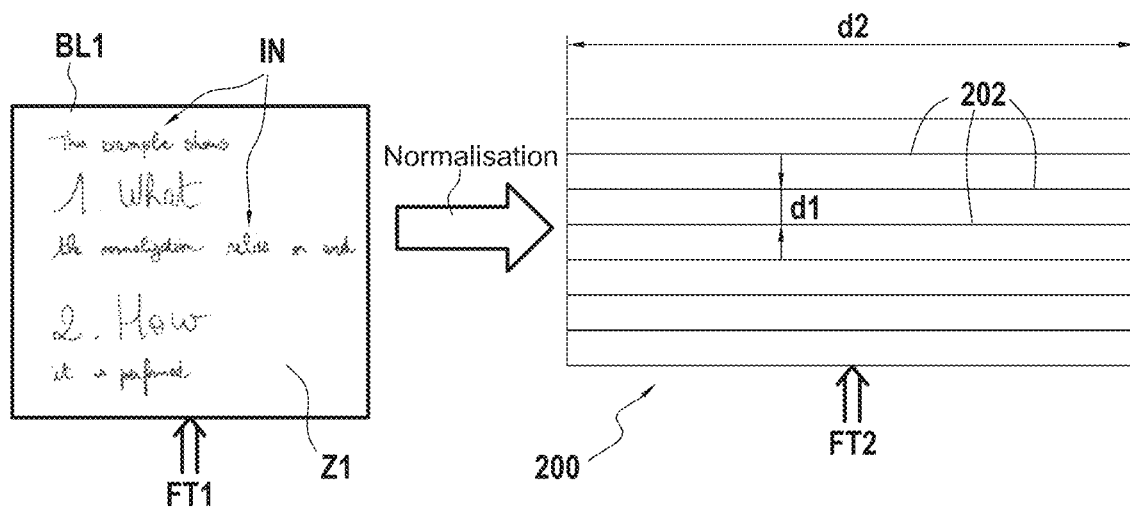
FIG. 3 depict schematically a normalization process according to a particular embodiment of the invention.

As shown in FIG. 3, in the present embodiment, the computing device 100 is configured to detect handwriting input IN which is input with the input surface 104 in a free handwriting format (or free handwriting mode) FT1, i.e. without any handwriting constraint for a user. The free handwriting mode allows a user to handwrite input elements IN in a free environment (e.g. in a blank zone Z1) in an unstructured or unguided fashion, that is, without any handwriting constraint of position, size and orientation of the text handwriting input (no line pattern to follow, no limitation of size or orientation, no constraint of interline, margin or the like, etc.). This free handwriting mode FT1 affords complete freedom to the user during handwriting input, which is sometimes desirable for instance to take quick and miscellaneous notes or make mixed input of text and non-text.

The handwriting input IN, detected by the input surface 104 and displayed by the display device 102, is formed by a plurality of input strokes of digital ink.

As depicted in FIG. 3, the computing device 100 may classify the input strokes forming the handwriting input IN as text and thus recognize the handwriting input IN as a text block BL1.

The computing device 100 is configured to perform a normalization process on the recognized text block BL1, thereby converting the text block BL1 from the free handwriting format FT1 into a structured format (or structured mode) FT2 to comply with a document pattern 200. A document pattern is understood in the present disclosure as defining geometrical constraints as to how text handwriting input IN is to be arranged and displayed on the display device 102. The document pattern 200 constitutes a structured (or formatted) environment for receiving the handwriting input IN (the text block BL1 in this case) in a structured manner, i.e. in the structured format FT2.

A document pattern may define at least one of the following handwriting constraints to be complied with by text: a margin of a display area; a line pattern; and an interline distance.

In the present example shown in FIG. 3, the document pattern 200 comprises a line pattern defining a plurality of guidelines (also called guiding lines or base lines) 202 according to which text (i.e. the content of the text block BL1) is to be arranged in accordance with the structured format FT2. The document pattern 202 may define a predetermined interline distance d1 between each pair of consecutive guidelines, thereby imposing a size constraint on text in the structured format FT2. The document pattern 202 may also define a predetermined line length d2 which imposes a maximum length of each text line of the text block BL1 in the structured format FT2. It should be understood that this structured format FT2, which is based on the document pattern 200, constitutes a mere example of implementation. Other document patterns can be contemplated by a person skilled in the art.

Figure 4:
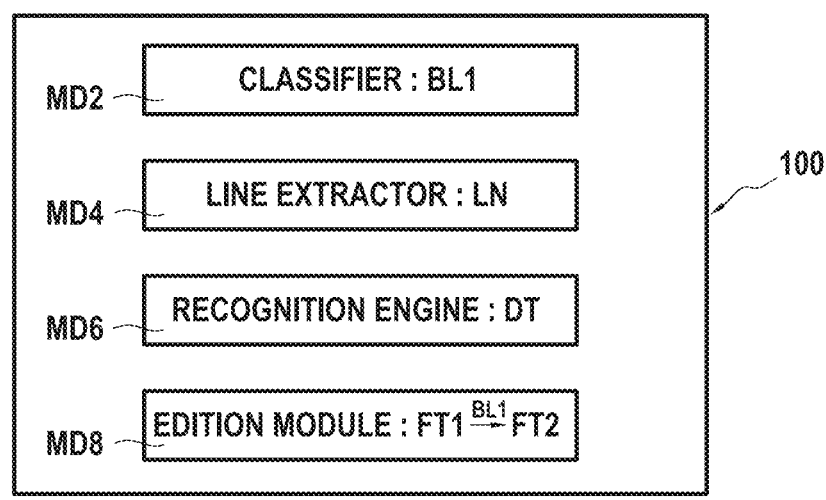
FIG. 4 is a block diagram representing schematically modules implemented by the computing device of FIG. 2, according to a particular embodiment of the invention.

As shown in FIG. 4 according to a particular embodiment, when running the application 112 stored in the memory 108 (FIG. 2), the processor 106 implements a number of processing modules, that is: a classifier MD2, a line extractor MD4, a recognition engine MD6 and an edition module MD8. The application 112 comprises instructions configuring the processor to implement these modules in order to perform steps of a method of the invention, as described later in particular embodiments.

The classifier MD2 is configured to classify each input stroke (or any set or combination of input strokes) detected by the input surface 104 as text or non-text. In particular, as described further below, the classifier MD2 may be configured to detect as text at least one text block BL1 of input strokes input in the free handwriting format FT1 with the input surface 104.

To this end, the classifier (or classifying module) MD2 may perform a disambiguation process to distinguish text from non-text content in the input digital ink entered by the user. The disambiguation process may be performed by any manner known to the skilled person. An exemplary implementation is described in U.S. Patent Application Publication No. 2017/0109578 A1.

As an example of disambiguation process, the classier MD2 may group strokes using spatial and temporal considerations to build hypotheses of which strokes may belong to non-text or text elements. The spatial considerations may include distance between strokes, geometry of the strokes, overlapping of the strokes, relative positions of the strokes . . . . The temporal considerations may include the time order of stroke input. Probability score may be calculated such that only hypotheses with a sufficiently high score (above a threshold) are retained. Features for each group of strokes are then extracted in consideration of shape and text language models. The features may include separation distances, changes in direction within strokes, overlap, direction of stroke pattern, curvature, etc. The strokes may then be classified by the classier MD2 into text and non-text by testing hypotheses based on all of the collected information, including extracted features of the group of strokes within those hypotheses and the spatial and temporal information of the strokes within those groups. As already mentioned, other techniques of non-text/text differentiation may however be contemplated.

In other examples, no classification as text/non-text is necessary as only text is received by the computing device 100 as handwriting input, such that text handwriting is directly detected with the input surface 104.

The line extractor (or line extracting module) MD4 is configured to extract text lines LN from the text block BL1 of input strokes detected by the classifier MD2. In other words, the line extractor MD4 is capable of identifying distinct text line LN forming collectively the text block BL1 (the text block BL1 is thus divided into multiple text lines LN). As described further below, such a line extraction may be performed as part of a text recognition process. In a particular example, the line extractor MD4 and the recognition engine MD6 form together a single module.

The recognition engine (or recognition module) MD6 is configured to perform a text recognition on each text line LN of the text block BL1 as extracted by the classifier MD2. Text recognition may be performed using any suitable technique known to a person skilled in the art, involving for instance generating a list of element candidates (or hypotheses) with probability scores and applying language models (lexicon, grammar, semantics, etc.) on the element candidates to find the best recognition result. Statistical information modelling for how frequent a given sequence of elements appears in the specified language or is used by a specific user may also be taken into account to evaluate the likelihood of the interpretation results produced by the recognition engine MD6. However, no further detail is provided to avoid unnecessarily obscuring the present disclosure. An example of implementing handwriting recognition can for instance be found in U.S. Patent Application Publication No. 2017/0109578 A1.

In the present embodiment, while performing text recognition, the recognition engine MD6 is configured to generate model data DT that associate each input stroke of the text block BL1 with a unique character, a unique word and a unique text line of the text block BL1. As described further below, model data DT define correlations (or links or references) between each stroke of the text handwriting input with a corresponding character, a corresponding word and a corresponding text line of the text handwriting input.

The edition module (or text editor) MD8 is configured to normalize each text line LN from the above-mentioned free handwriting format FT1 into the structured format FT2 to comply with the document pattern 200 (as illustrated in FIG. 3). As further described below, during this normalization, the edition module MD8 may be configured to perform for each text line LN:

computing for said text line LN a respective transform function to transform said text line LN into the structured format FT2 to comply with the document pattern 200;

applying the respective transform function to transform each input stroke of said text line LN into the structured format FT2; and updating the model data DT (and more particularly the model data DT related to said text line LN) based on the respective transform function.

In other words, when normalizing the text block BL1, the edition module BL1 converts on a line-by-line basis the text block BL1 from the free handwriting format FT1 into the structure format FT2.

Once normalization has been performed, the display device 102 may be configured to display the text block BL1 in the structured format FT2. The edition module MD8 may also be configured to perform further editing on the text block BL1 in the structured format FT2.

The configuration and operation of the modules MD2-MD8 of the computing device 100 will be more apparent in the particular embodiments described hereinbelow with reference to the figures. It is to be understood that the modules MD2-MD6 as shown in FIG. 4 represent only an example embodiment of the present invention, other implementations being possible.

For each step of the method of the present invention, the computing device may comprise a corresponding module configured to perform said step. At least two of these steps may be performed as part of a single module.

A method implemented by the computing device 100 illustrated in FIGS. 2-4 is now described with reference to FIGS. 5-12, in accordance with particular embodiments of the present invention. More specifically, the computing device 100 implements this method by executing the application 112 stored in the memory 108.

Figure 6:
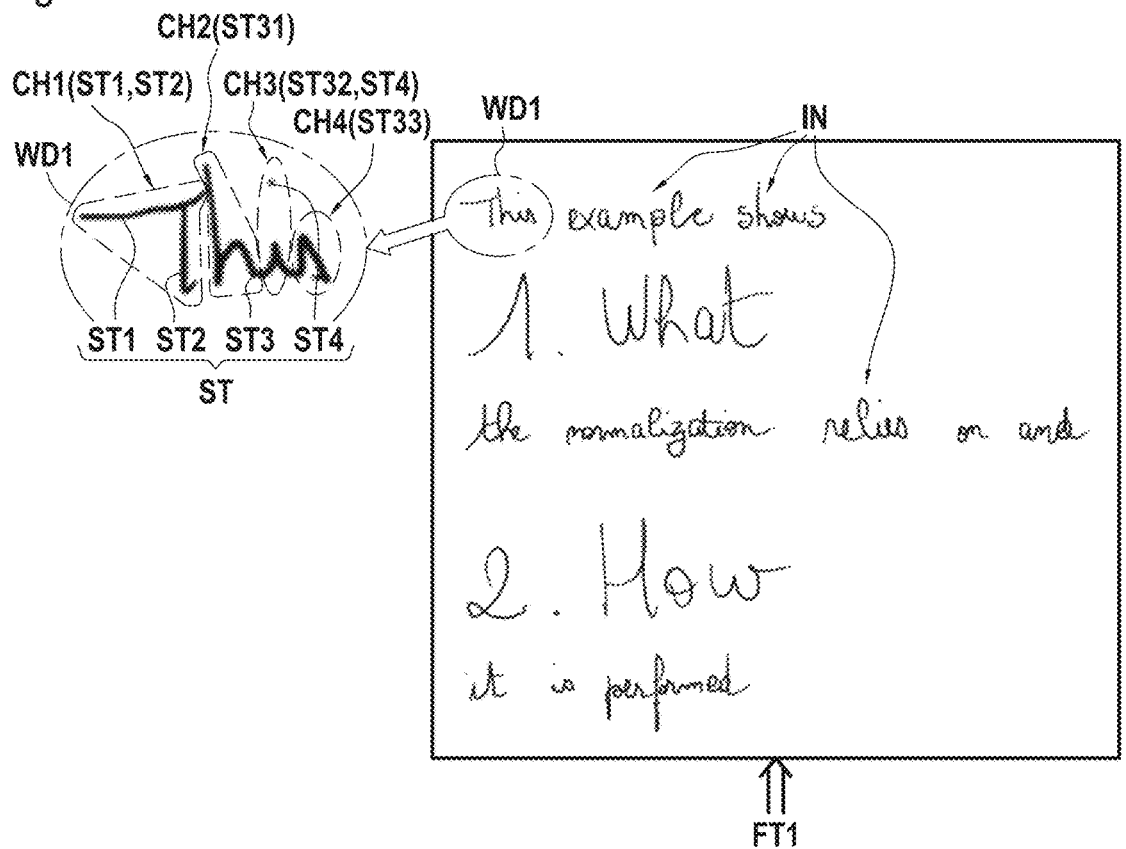
FIGS. 6-8 are schematic representations of text handwriting while processed by the computing device of FIG. 2, according to a particular embodiment of the present invention.

An example scenario is considered where a user enters handwriting input IN as shown in FIG. 6 on the computing device 100. Processing is then performed by the computing device 100, including a normalization process as described below.

More specifically, in a detecting step S2, the computing device 100 detects handwriting input IN entered by a user with the input surface 104 of the computing device 100. As shown in FIG. 6, the handwriting input IN comprises a plurality of input strokes ST of digital ink formed by the user with the input surface 104. For instance, a first string of characters "This" is formed by input strokes ST1, ST2, ST3 and ST4. As already indicated, each input stroke ST is characterized by at least a stroke initiation location, a stroke terminal location and the path connecting the stroke initiation and the stroke terminal locations. Accordingly, the dot positioned for instance at the top of the character "i" (in the word "This") constitutes a single stroke ST4 by itself.

In the present example, the handwriting digital ink IN is input in the free handwriting format FT1 as previously described (FIG. 3), that is, without any handwriting constraint in a predetermined input area of the display 102. Without any constraint of lines, size, orientation or the like to comply with, the user is allowed to handwrite content IN in a free and easy manner. As can be seen, the size, orientation and position of each handwritten character or each handwritten word may vary arbitrarily depending on the user's preferences. Although the handwriting input IN is shown in FIG. 6 along substantially parallel lines, handwriting input IN may be arranged along varying line orientations.

Figure 7:
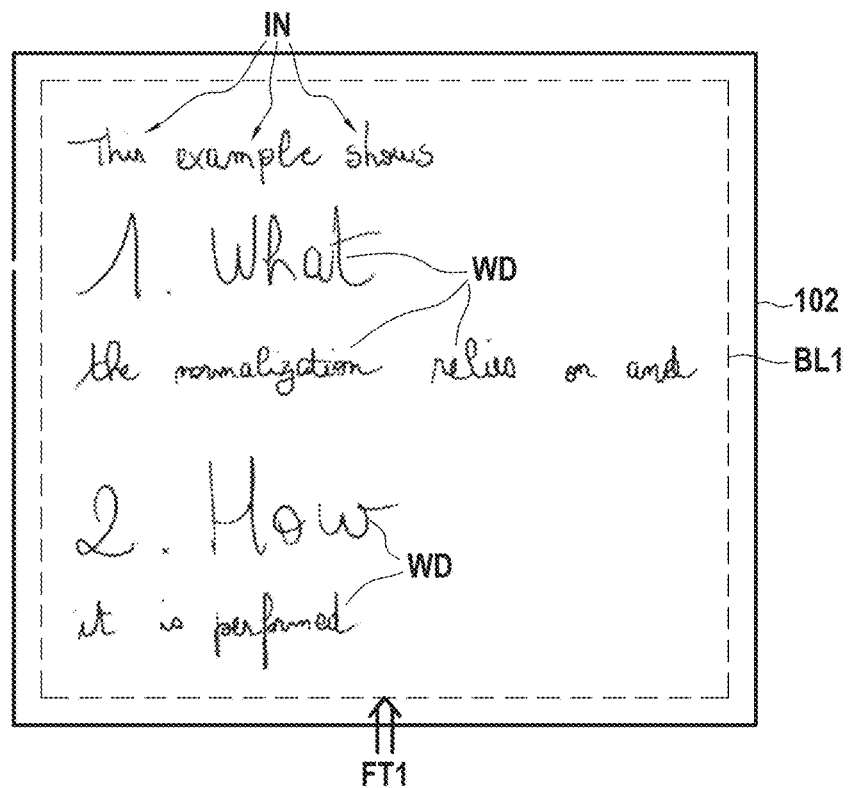

As shown in FIG. 7, the computing device 100 displays (S4) the plurality of input strokes ST of the handwriting input IN on the display device 102 in accordance with the free handwriting format (or mode) FT1.

In a classification step S6, the computing device 100 classifies each input stroke ST detected in the free handwriting format FT1 as either text or non-text. For this purpose, the classifier MD6 of the computing device 100 may perform a disambiguation process as described earlier, in any appropriate manner.

For a matter of simplicity, it is assumed in the present example that the entire handwriting input IN detected by the computing device 100 is text. Accordingly, during the classification step S6, the computing device 100 detects as text a text block BL1 formed by the input strokes ST input in the free handwriting format FT1. It should be noted that a single text block BL1 is detected by the computing device 100 in the present example for a matter of simplicity, although the concept of the invention would apply in the same manner with multiple text blocks detected by the computing device 100 in the handwriting input IN.

Figure 8:
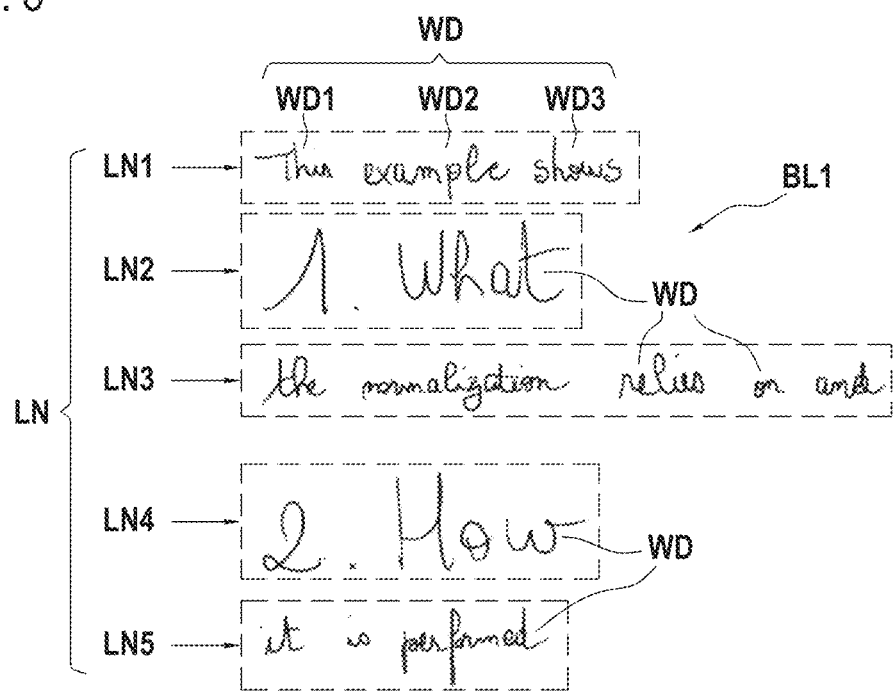

As shown in FIG. 8, the computing device 100 then performs (S8) a text recognition on the text block BL1. During the text recognition S8, the computing device 100 analyses various features of the input strokes ST to recognize predefined recognizable text elements such as characters CH (or symbols) as well as words WD (FIG. 8), in accordance with any appropriate language. As already mentioned, text recognition may be performed using any suitable technique known to a person skilled in the art, comprising for instance generating a list of element candidates (or hypotheses) with probability scores and applying language models (lexicon, grammar, semantics, etc.) on the element candidates to select the most suitable candidates. To this end, the recognition engine MD6 may use any appropriate linguistic information to parse and analyze the content of each text line LN to identify predefined characters.

The text recognition S8 comprises two steps which are described below, i.e. a line extraction step S10 and a generation step S12.

More specifically, during the text recognition S8, the computing device 100 performs a line extraction S10 to extract text lines LN from the text block BL1. In the present example, the computing device 100 divides the text block BL1 in 5 distinctive text lines LN1-LN5. Line extraction may be performed by the line extractor MD4 based on a geometric analysis of the strokes ST (or of sets of strokes ST) of the text block BL1 detected during the text/non-text classification S6. Based on a text analysis, the line extractor MD4 is capable of determining to which text line each input stroke ST belongs. A person skilled in the art may implement any suitable technique to allow identification of text lines within a text block input in a free handwriting mode.

Still during the text recognition S8, the computing device 100 also generates (S12) model data DT that associate each stroke ST of the text block BL1 with a unique character CH, a unique word WD and a unique text line LN of the text block BL1.

The model data DT define a document model (also called interactive text model) of the text block BL1. Each text line LN is structured according to this document model. As shown later, it is by establishing these correlations that ink interactivity can later be achieved when editing the text block BL1. For instance, erasing a word WD in the text blocks BL1 leads the computing device 100 to also erase all the constitutive characters CH referenced for this word WD according to the model data DT.

In the present example, the model data DT comprise 3 categories: character information, word information and line information. The model data, which may be organized in any suitable manner (e.g. as a tree of relationships or tree of references), define cross-references that link each stroke ST (or each portion of stroke) to a unique character CH, each character CH to a unique word WD, and each word WD to a unique text line LN, thereby establishing correlations between strokes ST (or portion of strokes), characters CH, words WD and text lines LN as detected in the text recognition S8. As a result, digital ink is structured and associated with model data DT to form interactive ink.

Figure 9:
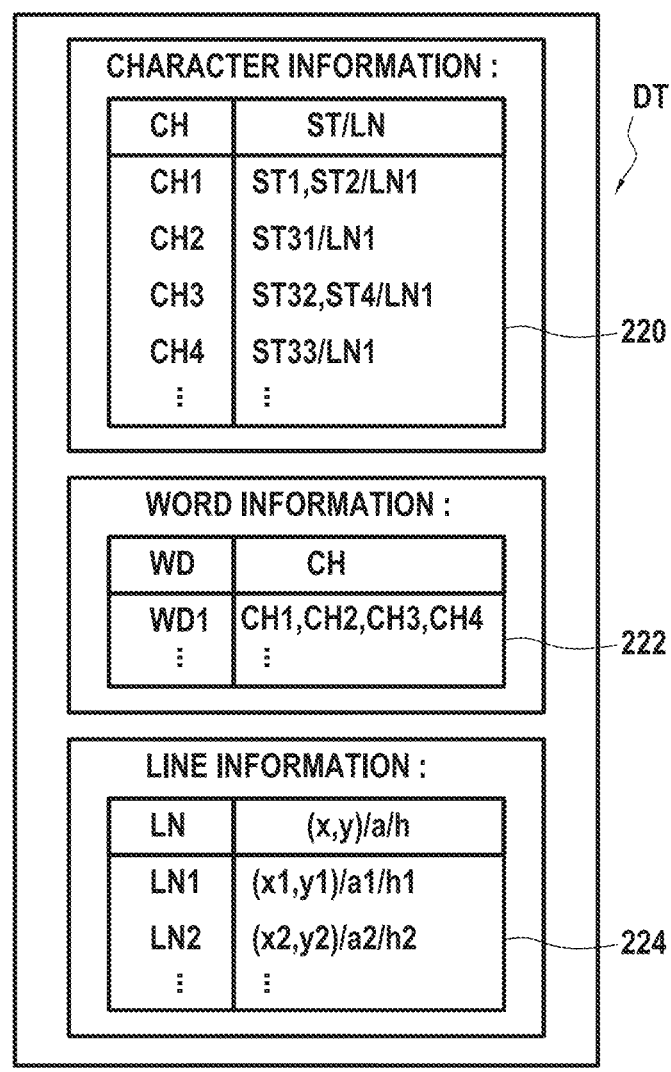
FIG. 9 depicts schematically model data generated by the computing device of FIG. 2, according to a particular embodiment of the present invention.

More particularly, as shown in FIG. 9 according to a particular example, the model data DT of the text block BL1 may comprise the following:

character information 220 defining a plurality of characters CH, each character CH being associated with at least one stroke ST of digital ink (or with at least a portion of a stroke ST) and with a text line LN of the text block BL1;

word information 222 defining a plurality of words WD, each word WD being associated with at least one character CH as defined by the character information 220; and line information 224 defining each text line LN of the text block BL1, each text line LN being associated with at least one word WD (or part of word) as defined by the word information 222.

It should be noted that a character CH may be formed by a single input stroke ST, by a plurality of input strokes ST, or by a portion of one or more input strokes ST. The character information 220 is representative of the link of each portion of stroke ST with a unique character CH. For instance, as shown in FIG. 6, the characters CH2, CH3 and CH4 recognized by the computing device 100 during the text recognition S10 are formed partially or entirely by the portions ST31, ST32 and ST33 of the stroke ST3, respectively.

In a particular example, the line information 224 comprises, for each text line LN of the text block BL1:

origin coordinates (x, y) representing an origin of the text line LN;

slant information (a) representing the slant of the text line LN; and height information (h) representing the height of the text line LN.

The line information 224 thus allows the computing device 100 to define the position, orientation and size of each text line LN.

It should be noted that any predetermined reference point belonging to a text line LN can be defined in the line information 224 as the above-mentioned "origin" of said text line LN.

The origin coordinates of the text lines LN may be defined by a pair of floating point values: Line (x, y). The slant information may be a floating point value: Line (a). The height information may be a floating point value: Line (h), representing for instance the average height of characters assigned to this text line according to the document model. In the present example, the height (h) is represented orthogonally to the slant (a) for each given text line LN.

The computation of the average height (h) for each text line LN may be performed by the computing device 100 so that ascenders and descenders of alphabets are taken into account in order to avoid noising the resulting average value of each text line.

By way of an example, the computing device 100 recognizes (S10) that the input strokes ST1-ST4 in the first text line LN1 collectively form the word WD1 in a particular structured manner. As a result, as shown in FIGS. 6 and 9, the computing device 100 generates (S12) model data DT which comprise character information 220 defining the following characters in association with text line LN1:

character CH1 associated with the stroke ST1 and with the stroke ST2;

character CH2 associated with the portion ST31 of the stroke ST3;

character CH3 associated with the portion ST32 (that complements portions ST31 and ST33) of the stroke ST3 as well as the stroke ST4; and character CH4 associated with the portion ST33 (that complements ST31 and ST32) of the stroke ST3.

The other characters CH in the text block BL1 are defined in an analogous manner in the character information 220.

Still in this example, the word information 222 defines the word WD1 associated with the characters CH1, CH2, CH3 and CH4. The other words WD in the text block BL1 are defined in an analogous manner in the word information 222.

Still in this example, the line information 224 defines the following lines:

text line LN1 which exhibits origin coordinates (x1, y1), slant information (a1) and height information (h1);

text line LN2 which exhibits origin coordinates (x2, y2), slant information (a2) and height information (h2); etc.

The other text lines LN3, LN4 and LN5 of the text block BL1 are defined in an analogous manner in the line information 224.

It should be understood however that the model data DT may be organized in manners other than the one illustrated in FIG. 9.

In a storing step S14, the computing device 100 stores in memory 108 the model data DT generated in S12.

Figure 10:
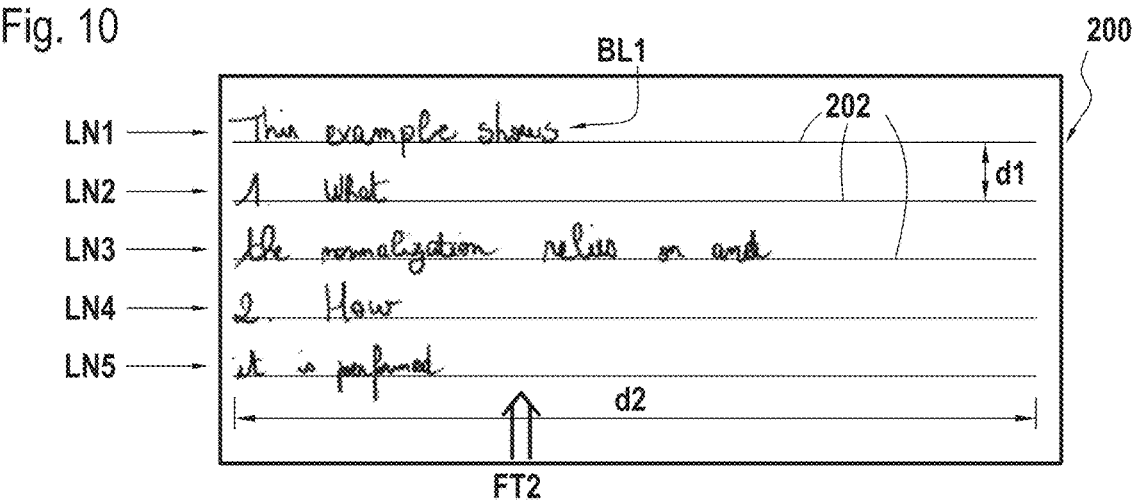
FIG. 10 represents schematically text handwriting which has been normalized by the computing device of FIG. 2, according to a particular embodiment of the present invention.

As shown in FIG. 10, in a normalization step S16, the computing device 100 normalizes each text line LN of the text block BL1 from the free handwriting format FT1 into the structured format FT2 as previously described. This normalization is performed on a line-by-line basis as described below in a particular example. This normalization allows the computing device 100 to convert the text block BL1 from an unconstrained environment (free handwriting mode FT1) into a formatted or structured environment (structured format FT2) so that it can be arranged and later displayed in a more organized and efficient manner according to the document pattern 200.

In the example of FIG. 10, the result of the normalization S16 is displayed by the computing device 100 on the display device 102. As can be seen, the text lines LN1-LN5 are normalized into a uniformed arrangement of position, size and orientation in accordance with the structured format FT2 as defined by the document pattern 200. For instance, the text lines LN2 and LN4 are down-sized to comply with the interline distance d1 imposed by the document pattern 200. All text lines LN are aligned and arranged according to the guiding lines 202. As already indicated, various other forms of normalization may be contemplated within the present invention.

This normalization S16 is achieved by transforming (S20) each text line LN of the text block BL1 so it is rearranged according to the structured format FT2. As described further below, these transformations are performed by applying a respective transform function TF to each text line LN. Additionally, the model data DT representing the text lines LN are updated (S22) by the computing device 100 based on the same transformations (as defined by the transform functions) applied to the text lines LN during normalization S16.

More specifically, during the normalization step S16 (FIG. 5), the computing device 100 performs a same iteration comprising steps S18, S20 and S22 for each text line LN of the text block BL1. For the sake of clarity, this iteration S18-S22 is described in details herebelow with respect to the first text line LN1 only. The steps S18-S22 may be applied in an analogous manner for each text line LN of the text block BL1.

During the determining step S18, the computing device 100 computes (or determines) a respective transform function TF to transform the text line LN1 into the structured format FT2 to comply with the document pattern 200. In a particular example, the computing device 100 acquires in S18 input parameters comprising the line information 224 of the text lines LN1, i.e. the origin coordinates (x1, y1), the slant information (a1) and the height information (h1) of the text line LN1. The computing device 100 then determines (S18) the transform function TF for the text line LN1 based on the acquired input parameters and on the document pattern 200 (taking into account, for instance, the line pattern of the document pattern 200 applicable in the structured format FT2). In particular, the computing device 100 may determine the transform function TF so that the text line LN1: moves to a first base line 202 of the document pattern 200, is oriented according to this first base line and is rescaled in accordance with the interline of the document pattern 200. For instance, the origin of the text line LN1 is moved at a predetermined position of the first base line 202.

Figure 11:
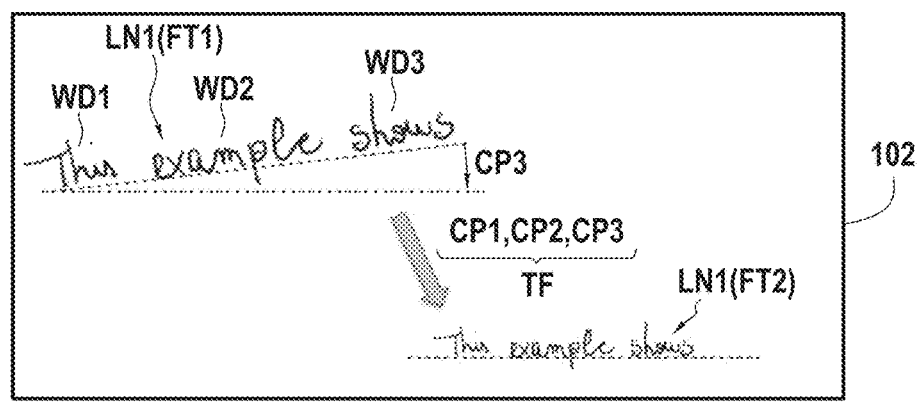
FIG. 11 represents editing operations that are applied on text handwriting during a normalization process, according to a particular embodiment of the present invention.

As depicted in FIG. 11, each transform function TF computed by the computing device 100 for a respective text line LN may define at least one of the following transformation components to be applied on said text line LN during the normalization step S16:
 a translation component CP1;
 a scale component CP2; and
 a rotation component CP3.

In the present case, it is considered that each transform function TF comprises these 3 components CP1, CP2 and CP3, although other implementations are possible.

The translation component CP1 may define a translation of the respective text line LN. The scale component CP2 may define a rescaling operation on the respective text line. Finally, the rotation component CP3 may define a rotation of the respective text line LN.

In a particular example, during the normalization step S16, the translation component CP1 of the transform function TF is determined to perform a translation of a text line (e.g. LN1) so that the origin of this text line is moved to be aligned with a corresponding base line 202 which is assigned to said text line during the normalization step S16.

In a particular example, during the normalization step S16, the scale component CP2 of the transform function TF is determined for a respective text line (e.g. LN1) based on a ratio of the distance d1 between two consecutive base lines 202 of the line pattern of the document pattern 200, relative to the height (e.g. h1) of the text line.

In a particular example, during the normalization step S16, the rotating component CP3 is determined to rotate a respective text line (e.g. LN3) so at to reduce its slant (e.g. a1) to zero in accordance with the document pattern 200 (taking for instance as a reference a base line 202 of the document pattern 200).

By way of an example, a transform function TF may define a rotation applied to a text line LN during normalization. The rotation to be applied to a slanted line LN may be a rotation of the opposite angle of the slant (a). For a given slant (a) of a text line LN, the rotation component CP3 of the transform TF may thus be a rotation of (−a). When the transform function TF implies a rotation, it may cause a rotation of each point of the impacted stroke(s) or stroke portions around the origin of the text line LN. As explained further below, the line information 224 may also be updated accordingly (by setting the line slant (a) at zero: a=0).

It should be noted that that a rotation of a text line LN is not always necessary to convert it into the structured format FT2, that is, when the text line LN is already in the appropriate orientation (e.g. when the text line LN is handwritten in the free handwriting format FT1 substantially along the direction of a respective base line 202 of the document pattern 200). In such case, the rotation component CP3 can be set such that CP3=0.

Similarly, in some cases, the components CP1 and/or CP2 may be set at zero if no translation and/or no rescaling is respectively necessary to convert a respective text line LN into the structured format FT2.

In a particular example, the computing device 100 determines in S18 a transform function TF for the text line LN1 such that at least one of the components CP1, CP2 and CP3 is different from zero. In the example shown in FIG. 11, the transform function TF is computed so that the text line LN1 reading "This example shows" is moved (translation movement) on the display device 102 according to the translation component CP1, is rescaled (downsized) according to the scale component CP2, and is rotated by an angle according to the rotation component CP3.

In a transformation step S20, the computing device 100 applies the respective transform function TF to transform each stroke ST of the text line LN1 into the structured format FT1. In the present example, the computing device 100 thus move (translation movement) the text line LN1 according to the translation component CP1, rescales the text line LN1 according to the scale component CP2 and rotates the text line LN1 according to the rotation component CP3, as already described above with respect to FIG. 11.

In an updating step S22, the computing device 100 also updates the model data DT of the text block BL1 based on the respective transform function TF determined in S18 for the text line LN1. More particularly, the computing device 100 updates the part of the model data DT related to the text line LN1 in accordance with the respective transform function TF computed in S18.

In the present example, during the updating step S22, the computing device 100 updates the line information 224 of the model data DT associated with the text line LN1, based on the respective transform function TF determined in S18. As a result, the origin coordinates (x1, y1), the slant information (a1) and the height information (h1) are updated in accordance with the components CP1, CP3 and CP2, respectively.

As indicated above, the steps S18, S20 and S22 are performed in an analogous manner for each text line LN detected in the line extraction step S10. As a result, the text block BL1 undergoes normalization (S16) so that it is converted (S20) into the structured format FT2, causing the associated model data to be updated (S22) accordingly. This normalization is performed on a line-by-line basis in the sense that each text line LN is normalized based on a dedicated transform function TF and the model data related to each text line LN is updated based on this dedicated transform function TF.

The updating step S22 may be performed before or after the transformation step S20. More generally, the order in which the sequence of steps S18-S22 is performed for the different text lines LN may be adapted by a person skilled in the art.

Figure 5:
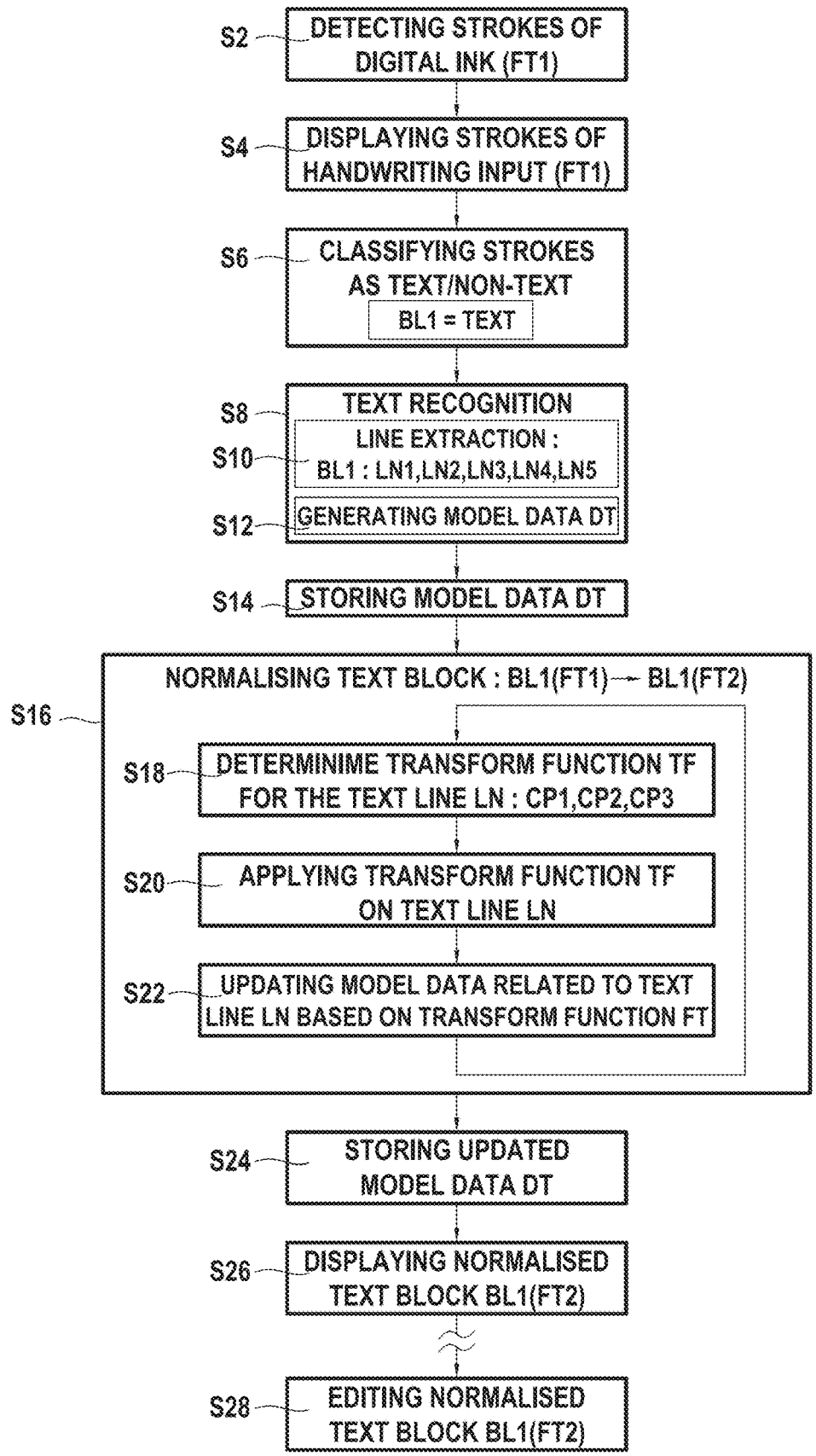
FIG. 5 is of flow diagram representing schematically steps of a method according to a particular embodiment of the present invention.

As shown in FIG. 5, the computing device may store (S24) the updated model data DT in the memory 8 (FIG. 2). This storing step may be performed progressively while the update S22 is performed for each text line LN of the text block BL1. In the present example, the updated model data DT of the text block BL1 is stored in S24 in replacement of the original model data DT stored in S14.

Further, the computing device 100 may display (S26) the normalized text block BL1 as depicted in FIG. 10. Once normalized, the text block BL1 is arranged according to the structured format FT2 to comply with (to match) the document pattern 200 as previously described.

The base line 202 of each text line LN may be drawn by the computing device 100 using the origin and slant as defined in the corresponding line information 224. Additionally, the value of the height of each text line LN may be represented using highlighted rectangles (or the like) on the display device 102. The origin of each text line LN may be used as an anchor point when the text lines are rescaled during normalization.

The text normalization S16 of the text block BL1 from a free handwriting format into a structured context or format (such as FT2) improves the overall experience provided by ink interactivity. Normalization enables not only to arrange and display in a more uniform and structured manner text handwriting input but it also allows to improve reliability of the text recognition system and edition efficiency, as explained below.

The invention allows to structure digital ink with model data to form interactive ink. As indicated earlier, the model data DT define cross-references that link each stroke ST to a unique character CH, each character CH to a unique word WD and each word WD to a unique text line LN, thereby enabling ink interactivity. For instance, erasing a word in the text block implies also erasing all characters referenced by this word according to the document model. By way of another example, erasing all content of a given line LN doesn't only erase this line from the model data, but also leads the computing device 100 to erase all the constitutive words WD and characters CH of this line. It is these correlations defined by the model data DT which allows a line-by-line normalization process as described above.

Thanks to the invention, text handwriting input can be normalized while maintaining up-to-date the associated model data representative of the input text handwriting, such that no additional text recognition needs to be performed in response to the transformations performed during the normalization process. In other words, as part of the normalization process, the computing device 100 updates the correlations between the stroke ST, characters CH, words WD and text lines LN of the text handwriting input IN as defined in the model data, such that it is not necessary to perform once again a text recognition on the normalized text block BL1 that may otherwise conflict with the results of the initial text recognition performed in S8.

Generally speaking, the text recognition engine in a known computing device is usually configured to monitor any ink modification or editing happening on text handwriting (e.g. deletion or editing of a stroke). Accordingly, should text normalization happen on such a known computing device, it would cause the text recognition engine to run again during normalization to try to recognize possibly new content in the text handwriting input once converted into a structured format. In other words, normalization of digital ink in known systems leads to discarding previous recognition result and re-process the whole ink to obtain a new recognition result. While such a responsive text recognition mechanism may be useful when the ink modifications result from some forms of editing of the user in the free handwriting mode for instance, it would actually be counterproductive for the computing device 100 to perform a new text recognition in response to the normalization S16 of the text block BL1 from the free handwriting format FT1 into the structured format FT2. Any additional text recognition in response to the normalization S16 would risk to pollute or conflict with the initial text recognition S8 performed on the text handwriting input IN in the free handwriting mode FT1.

Additionally, performing such an additional text recognition process would require time and resources. Updating the model data DT according to the transform functions TF applied to the digital ink during normalization allows leaving the digital ink and associated data in a consistent and coherent state, while saving time and resources.

Instead of triggering a new text recognition in response to the normalization S16 performed on the text block BL1, the computing device 100 of the present invention is configured to update the model data DT of the text block BL1 in accordance with the transform functions TF applied to the text lines LN during normalization.

The point of the normalization process in the present invention is to manipulate the digital ink for a given initial recognition result (i.e. the result of the initial text recognition S8). To this end, the computing device 100 may transform the digital ink of the text block BL1 into the structured format FT2 and update the document model accordingly so that the result of the initial text recognition S8 obtained in the free handwriting mode is not challenged.

In a particular embodiment, during the normalizing step S16, the model data DT of each text line LN is updated according to the respective transform function TF obtained in S18 while blocking any text recognition resulting from applying the respective transform function TF. As a result, the computing device 100 inhibits any new text recognition in response to the normalization performed on the text block BL1 in step S16. Thus, the recognized text remains stable even though digital ink is transformed during normalization, thereby improving reliability and efficiency of the overall recognition system.

It should be understood however that once the text block BL1 has been normalized into the structured format FT2 (as shown in FIG. 10), a new text recognition may be triggered to reflect any subsequent form of editing or ink modification performed later on the normalized text block BL1. If for instance a user decides to edit the first text line LN1 (e.g. by erasing strokes or stroke portions of a word WD or of a character CH, or by correcting it) in the structured mode FT2, the computer device 100 may perform a new text recognition to recognize text that may differ from the result of the initial text recognition S8.

Accordingly, the computing device 100 preferably triggers a new text recognition in response to an editing operation performed after the normalization step S16. In such a case, the text recognition function is not permanently blocked in the computing device 100 but, instead, is kept active once the normalization S16 is completed for allowing new content to be recognized in case of later editing on the text block BL1 in the structured format FT2. The handwriting text may be thus more reliably and easily processed by the computing device 100 after normalization for further operations and interactions, such as any form of editing (e.g. text reflow or the like).

Further, the present invention allows a user to input text handwriting in a free handwriting mode. By nature, no constraint of lines, size and orientation (including guidelines, margin or the like) is imposed on a user in a free handwriting mode, such that various and complex forms of handwriting may be input. By normalizing the text handwriting input into a structured format as described earlier, implementation of editing functions by the computing device 100 on text handwriting (corrections, rescaling, etc.) can be facilitated. Normalization may result for instance from a user-initiated command received by the computing device or from any predetermined event detected by the computing device. A user may edit and manipulate the handwriting input in a more structured and advanced manner, even though a free handwriting mode has been initially used, thereby improving the user experience.

Figure 12:
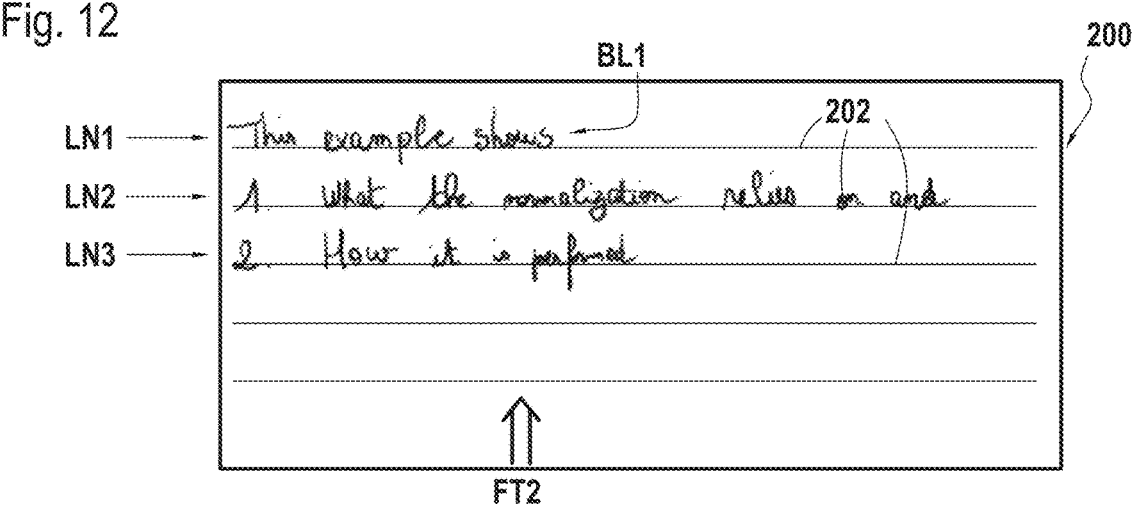
FIG. 12 represents schematically text handwriting which is edited after normalization, according to a particular embodiment of the present invention.

As shown for example in FIG. 12, once the normalization S16 is completed, the computing device 100 may perform an edition operation during an edition step S28. In the present example, text reflow is performed on the normalized text block BL1 in the horizontal direction (vertical text reflow is also possible). As a result, the relative positions of the different digital ink strokes of the text block BL1 in the structured format FT2 are rearranged. Such an editing operation may be triggered by a user in response to any suitable user command (e.g. a user gesture on the input surface 104), or by the computing device 100 itself upon detection of a predetermined event.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

The present invention having been described in particular embodiments, it is clear that it is susceptible to numerous modifications and embodiments within the ability of those skilled in the art, in accordance with the scope of the appending claims. In particular, the skilled person may contemplate any and all combinations and variations of the various embodiments described in this document that fall within the scope of the appended claims.

The invention claimed is:

1. A method for processing text handwriting on a computing device, the computing device comprising a processor, a memory and at least one non-transitory computer readable medium for processing text handwriting under control of the processor, the method comprising:
    detecting, with an input surface, a plurality of input strokes of digital ink handwritten in a free handwriting format without any handwriting constraint;
    displaying said plurality of input strokes on a display device handwritten in said free handwriting format;
    classifying each input stroke as text or non-text, said classifying comprising detecting as text at least one text block of handwritten text from said plurality of input strokes handwritten in the free handwriting format;
    performing text recognition on said at least one text block, said text recognition comprising:
        extracting text lines of handwritten text from said at least one text block of handwritten text; and
        generating model data representative of the handwritten text associating each stroke of said at least one text block with a character, a word and a text line of said at least one text block; and
    normalizing each text line of the recognized handwritten text from the free handwriting format into a structured format to comply with a document pattern comprising a line pattern, wherein said document pattern defines handwriting constraints that constrain the handwritten text, said normalization comprising for each text line of handwritten text:
        computing for said text line a respective transform function to transform said text line into the structured format such that said text line of handwritten text is arranged according to guidelines defined by said line pattern;
        applying the respective transform function to the text line to transform each stroke of said text line into the structured format;
        blocking any text recognition on said at least one text block resulting from applying the respective transform function to said text line; and
        updating the model data of said text line based on the respective transform function, said updating comprising updating in the model data correlations between the strokes, characters, words, and text lines of the handwritten text.

2. The method of claim 1, comprising storing the model data generated during said text recognition, wherein said updating the model data further comprises storing the updated model data of said at least one text block in replacement of the model data generated during said text recognition.

3. The method of claim 1, comprising, after said normalizing, displaying the text lines of said at least one text block in the structured format.

4. The method of claim 1, wherein the model data of the at least one text block comprise:
    character information defining a plurality of characters, each character being associated with at least one stroke of digital ink and with a text line of said at least one text block;
    word information defining a plurality of words, each word being associated with at least one character as defined by the character information; and
    line information defining each text line of said at least one text block, each text line being associated with at least one word as defined by the word information.

5. The method of claim 4, wherein the line information comprises, for each text line of said at least one text block:
    origin coordinates representing an origin of the text line;
    slant information representing a slant of the text line; and
    height information representing a height of the text line.

6. The method of claim 1, wherein said updating the model data during said normalizing comprises updating the line information of said text line based on the respective transform function.

7. The method of claim 1, wherein said normalizing comprises for each text line:
    determining input parameters comprising the origin coordinates, the slant information and the height information of said text line,
    wherein the respective transform function is computed based on the input parameters and on the document pattern.

8. The method of claim 1, wherein the document pattern defines at least one of the following handwriting constraints that constrain handwritten text:
    a margin of a display area; and
    an interline distance.

9. The method of claim 1, wherein each transform function defines at least one of the following transformation components to be applied on each text line of handwritten text during said normalizing:
    a translation component;
    a scale component; and
    a rotation component.

10. The method of claim 9, wherein the line pattern defining guidelines according to which text is to be arranged in the structured format.

11. The method of claim 10, wherein the scale component of the transform function is determined during said normalizing based on a ratio of the distance between two consecutive guidelines of said line pattern relative to the height of the respective text line.

12. The method of claim 10, wherein the translation component of the transform function is determined during said normalizing to perform a translation of a text line so that the origin of said text line is moved to be aligned with a corresponding guideline of the line pattern which is assigned to said text line during said normalizing.

13. The method of claim 9, wherein said rotating component is determined during said normalizing to rotate a respective text line so at to reduce its slant to zero in accordance with the document pattern.

14. The method of claim 1, wherein during said normalizing, the model data of each text line is updated according to the respective transform function while blocking any text recognition that may result from said applying the respective transform function.

15. A computing device for handwriting text, the computing device comprising:
- an input surface for detecting a plurality of strokes of digital ink handwritten in a free handwriting format without any handwriting constraint;
- a display device for displaying said plurality of input strokes handwritten in said free handwriting format; and
- a processor configured to function as:
- a classifier for classifying each stroke as text or non-text, said classifier being configured to detect as text at least one text block of handwritten text from said plurality of input strokes handwritten in the free handwriting format;
- a line extractor to extract text lines of handwritten text from said at least one text block of handwritten text;
- a recognition engine for performing a text recognition on each text line of said at least one text block, thereby generating model data representative of the handwritten text associating each stroke of said at least one text block with a character, a word and a text line of said at least one text block; and
- a text editor for normalizing each text line of recognized handwritten text from the free handwriting format into a structured format to comply with a document pattern comprising a line pattern, wherein said document pattern defines handwriting constraints that constrain the handwritten text, said text editor being configured to perform for each text line of handwritten text:
  - computing for said text line a respective transform function to transform said text line into the structured format such that said text line of handwritten text is arranged according to guidelines defined by said line pattern;
  - applying the respective transform function to the text line to transform each stroke of said text line into the structured format;
  - blocking any text recognition on said at least one block resulting from applying the respective transform function to said text line; and
  - updating the model data of said text line based on the respective transform function, said updating comprising updating in the model data correlations between the strokes, characters, words, and text lines of the handwritten text.

16. A non-transitory computer readable medium having a computer readable program code embodied therein, said computer readable program code adapted to be executed to implement a method for processing text handwriting on a computing device, the computing device comprising a processor, a memory and at least one non-transitory computer readable medium for processing text handwriting under control of the processor, the method comprising:
- detecting, with an input surface, a plurality of input strokes of digital ink handwritten in a free handwriting format without any handwriting constraint;
- displaying said plurality of input strokes on a display device handwritten in said free handwriting format;
- classifying each input stroke as text or non-text, said classifying comprising detecting as text at least one text block of handwritten text from said plurality of input strokes handwritten in the free handwriting format;
- performing text recognition on said at least one text block, said text recognition comprising:
  - extracting text lines of handwritten text from said at least one text block of handwritten text; and
  - generating model data representative of the handwritten text associating each stroke of said at least one text block with a character, a word and a text line of said at least one text block; and
- normalizing each text line of recognized handwritten text from the free handwriting format into a structured format to comply with a document pattern comprising a line pattern, wherein said document pattern defines handwriting constraints that constrain the handwritten text, said normalization comprising for each text line of handwritten text:
  - computing for said text line a respective transform function to transform said text line into the structured format such that said text line of handwritten text is arranged according to guidelines defined by said line pattern;
  - applying the respective transform function to the text line to transform each stroke of said text line into the structured format;
  - blocking any text recognition on said at least one text block resulting from applying the respective transform function to said text line; and
  - updating the model data of said text line based on the respective transform function, said updating comprising updating in the model data correlations between the strokes, characters, words, and text lines of the handwritten text.

* * * * *